United States Patent
Hung (10) Patent No.: US 10,146,104 B2
(45) Date of Patent: Dec. 4, 2018

(54) LAMP CUP AND CAMERA

(71) Applicant: VIVOTEK INC., New Taipei (TW)

(72) Inventor: Shih-Hsuan Hung, New Taipei (TW)

(73) Assignee: VIVOTEK INC., New Taipei (TW)

( * ) Notice: Subject to any disclaimer, the term of this patent is extended or adjusted under 35 U.S.C. 154(b) by 0 days.

(21) Appl. No.: 15/884,391

(22) Filed: Jan. 31, 2018

(65) Prior Publication Data

US 2018/0275489 A1    Sep. 27, 2018

(30) Foreign Application Priority Data

Mar. 27, 2017 (TW) .............................. 106110062 A (51) Int. Cl.
| | |
|---|---|
| *G03B 15/05* | (2006.01) |
| *H04N 5/225* | (2006.01) |
| *F21V 7/09* | (2006.01) |
| *H04N 5/372* | (2011.01) |

(52) U.S. Cl.
CPC ........... *G03B 15/05* (2013.01); *H04N 5/2256* (2013.01); *H04N 5/372* (2013.01); *G03B 2215/0503* (2013.01); *G03B 2215/0567* (2013.01); *G03B 2215/0571* (2013.01); *G03B 2215/0575* (2013.01); *G03B 2215/0582* (2013.01)

(58) Field of Classification Search
None
See application file for complete search history.

(56) References Cited

U.S. PATENT DOCUMENTS

| | | | | |
|---|---|---|---|---|
| 9,534,763 | B2* | 1/2017 | Shih | F21V 7/0025 |
| 2005/0088624 | A1* | 4/2005 | Lee | G03B 21/005 |
| | | | | 353/31 |
| 2005/0213958 | A1* | 9/2005 | Uemura | G03B 15/05 |
| | | | | 396/182 |
| 2008/0128714 | A1* | 6/2008 | Pang | G02B 6/0031 |
| | | | | 257/88 |
| 2010/0061096 | A1* | 3/2010 | Sato | G02B 6/0043 |
| | | | | 362/235 |
| 2012/0195034 | A1* | 8/2012 | Kuo | F21V 7/0033 |
| | | | | 362/186 |

(Continued)

FOREIGN PATENT DOCUMENTS

| | | |
|---|---|---|
| CN | 101858565 A | 10/2010 |
| TW | 201441752 A | 11/2014 |

*Primary Examiner* — William B Perkey
(74) *Attorney, Agent, or Firm* — Winston Hsu (57) ABSTRACT

A camera includes an image-capturing part, a plurality of lamp cups, and a plurality of lighting parts disposed in the lamp cups correspondingly. The lamp cup includes two reflection members oppositely disposed. One of the reflection members thereon defines a light source position and has a first reflecting surface. The other reflection member has a second reflecting surface toward the light source position, and a third reflecting surface, close to the second reflecting surface and toward the first reflecting surface. The first reflecting surface and the third reflecting surface form a light-out opening therebetween. Some light travels from the light source position to be reflected by the second reflecting surface and the first reflecting surface in order to emit out of the light-out opening. Some light travels from the light source position to be reflected by the third reflecting surface to emit out of the light-out opening.

16 Claims, 7 Drawing Sheets

(56) References Cited

U.S. PATENT DOCUMENTS

| | | | |
|---|---|---|---|
| 2012/0321290 A1* | 12/2012 | Daijo | G02B 6/0018 396/200 |
| 2013/0308104 A1* | 11/2013 | Nishimori | G03B 21/2013 353/37 |
| 2013/0308338 A1* | 11/2013 | Lin | F21V 9/30 362/609 |
| 2014/0002281 A1* | 1/2014 | Jafrancesco | F21S 43/30 340/985 |
| 2016/0084474 A1* | 3/2016 | Ohno | F21V 7/0041 362/235 |
| 2017/0131620 A1* | 5/2017 | Nakahara | G02B 6/0051 |
| 2017/0205685 A1* | 7/2017 | Gergley | G03B 15/06 |
| 2018/0120672 A1* | 5/2018 | Huang | F21K 9/66 |

\* cited by examiner

LAMP CUP AND CAMERA

BACKGROUND OF THE INVENTION

1. Field of the Invention

The invention relates to a lamp cup and a camera, and especially relates to a lamp cup used for an illumination light source and to a camera having an auxiliary light source.

2. Description of the Prior Art

Fisheye cameras have a wide-angle lens, so that the fisheye cameras can capture images of a scene in a relatively large angle. For example, when a fisheye camera is disposed on a ceiling of a room, the image-capturing area of the fisheye camera includes the whole floor and most walls of the room. When environment light is insufficient, infrared or visual light (e.g. provided by LEDs capable of emitting infrared or visual light) is usually used to fill light. Current surveillance cameras are usually provided with an auxiliary light source for emitting auxiliary light (e.g. infrared or visual light). In general, the auxiliary light source uses one or more lighting parts in coordination with a corresponding parabolic lamp cup toward a shooting direction to project auxiliary light. However, just by projecting light toward the shooting direction, not all of the image-capturing area of the fisheye camera can receive enough and proper illumination. For example, on the one hand, when the area in front of the fisheye camera (i.e. the floor) receives proper illumination, the walls cannot receive enough illumination resulting in a much darker area corresponding to the walls (or without sufficient exposure) in a captured image. On the other hand, when the walls receive proper illumination, the floor will receive excessive illumination resulting in a much brighter area corresponding to the floor (or with excessive exposure) in a captured image. Therefore, it is difficult to provide uniform auxiliary light to the image-capturing area of the fisheye camera for the current fisheye cameras by using the auxiliary light source.

SUMMARY OF THE INVENTION

An objective of the invention is to provide a lamp cup and a camera having an auxiliary light source. The lamp cup uses an asymmetric reflecting structure for providing different light reflection paths so as to provide uniform light projection. The auxiliary light source of the camera uses the lamp cup; therefore, the auxiliary light source can provide uniform auxiliary light illumination.

A lamp cup according to the invention includes a first reflection member and a second reflection member. A light source position and a vertical direction are defined on the first reflection member. The first reflection member has a first reflecting surface. The first reflecting surface is toward the vertical direction. The second reflection member is disposed opposite to the first reflection member. The second reflection member has a second reflecting surface and a third reflecting surface adjacent to the second reflecting surface. The second reflecting surface is toward the light source position. The third reflecting surface is toward the first reflecting surface. The first reflection member and the second reflection member form a light-out opening between the first reflecting surface and the third reflecting surface. wherein when a lighting part is disposed on the light source position toward the vertical direction and emits light, the light that travels from the lighting part toward the second reflecting surface is reflected by the second reflecting surface and then is reflected by the first reflecting surface to emit out through the light-out opening, and the light that travels from the lighting part toward the third reflecting surface is reflected by the third reflecting surface to emit out through the light-out opening.

A camera according to the invention includes an image-capturing part and a light-emitting device. The image-capturing part is disposed toward a vertical direction for capturing images of an environment area. The environment area includes a central portion and an outer portion surrounding the central portion. The light-emitting device surrounds the image-capturing part relative to the vertical direction for projecting light onto the outer portion. The light-emitting device includes a plurality of lighting parts and a plurality of corresponding lamp cups as the above-mentioned lamp cup. The lighting part is disposed in the light source position of the corresponding lamp cup.

Therefore, compared with the prior art, the lamp cup according to the invention provide different reflection paths to light from the light source position, so that after emitting out through the light-out opening, the light can provide uniform illumination to an illuminated area, which avoids the problem in the prior art that the conventional parabolic lamp cup will produce excessively bright illumination to the central area of an illuminated area. The auxiliary light source of the camera according to the invention uses the lamp cup to provide uniform illumination to a scene, so that a captured image of the scene will not have an excessive dark or excessive bright problem.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 7 is a top view of an environment area, which the camera in FIG. 6 can capture images of.

DETAILED DESCRIPTION

Figure 1:
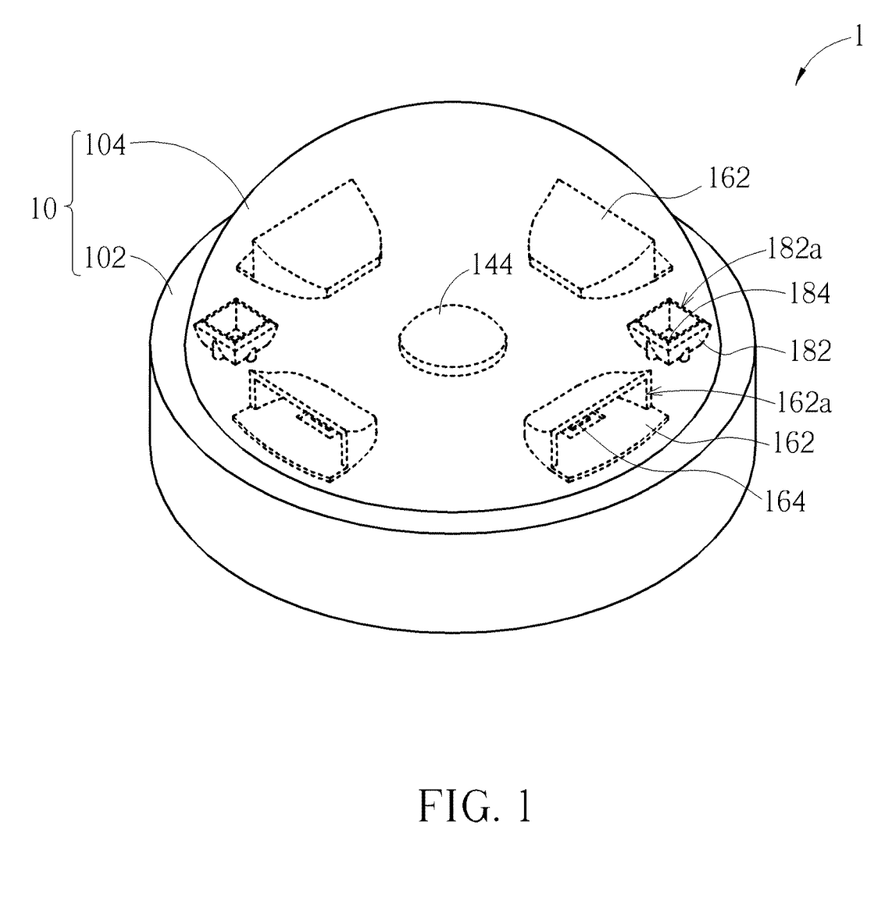
FIG. 1 is a schematic diagram illustrating a camera of an embodiment according to the invention.
Figure 2:
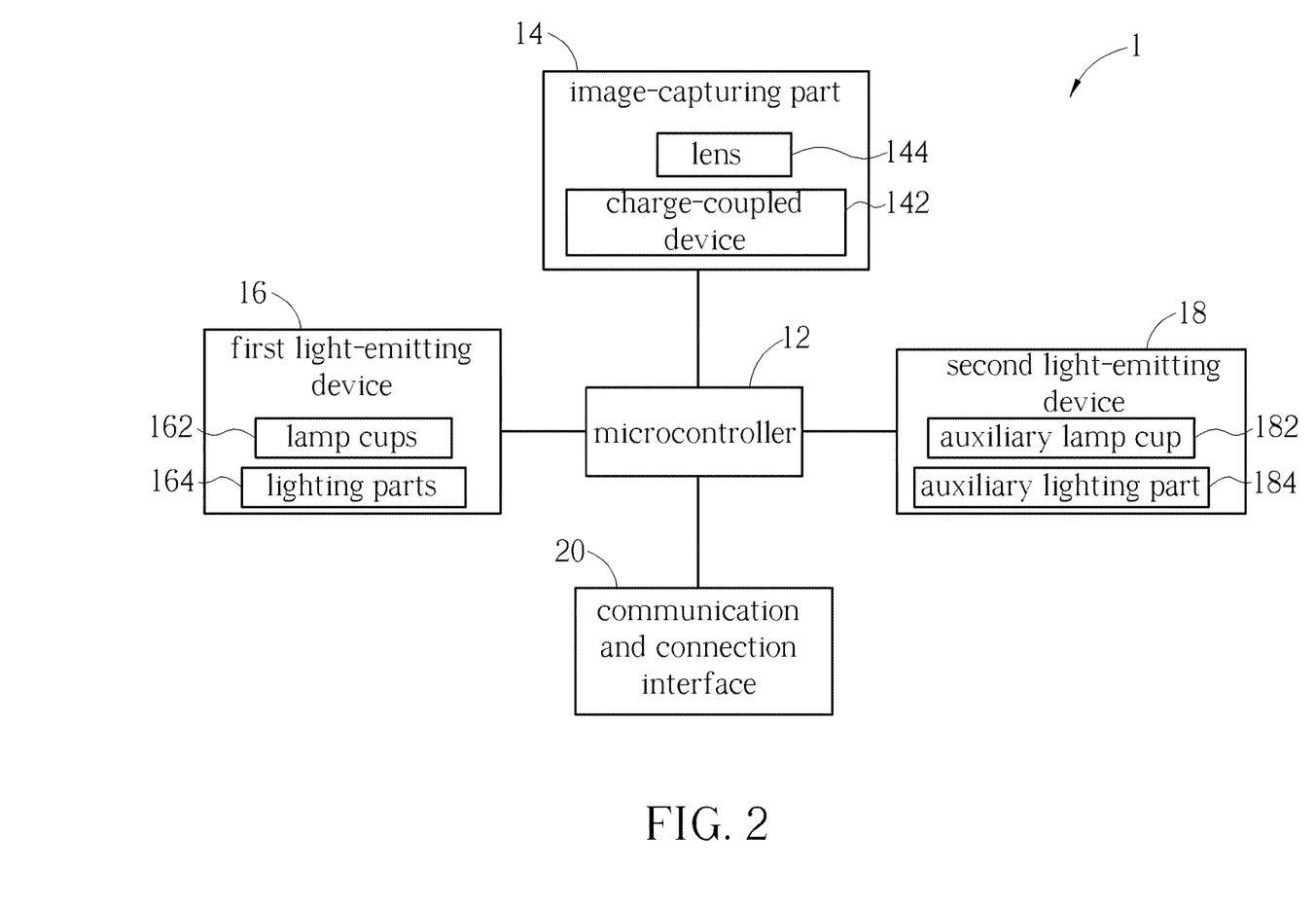
FIG. 2 is a functional block diagram of the camera in FIG. 1.

Please refer to FIG. 1 and FIG. 2. A camera 1 of an embodiment according to the invention includes a device casing 10, a microcontroller 12, an image-capturing part 14, a first light-emitting device 16, a second light-emitting device 18, and a communication and connection interface 20. The camera 1 defines a vertical direction V1 thereon. The device casing 10 includes a mount 102 and a transparent protection cover 104 engaged with the mount 102 for accommodating the above components (shown in dashed lines in FIG. 1). The microcontroller 12 is disposed on the mount 102. The image-capturing part 14 includes a charge-coupled device 142 (CCD) and a lens 144. The charge-coupled device 142 is disposed on the mount 102 toward the vertical direction V1 and is electrically connected to the microcontroller 12. The lens 144 is disposed above the charge-coupled device 142. In practice, the lens 144 can be a wide-angle lens, for example but not limited to a fisheye lens. The first light-emitting device 16 includes a plurality of lamp cups 162 (e.g. four lamp cups) and a plurality of lighting parts 164 (e.g. four lighting parts). The lamp cups 162 are disposed on the mount 102 and surround the image-capturing part 14 relative to the vertical direction V1. Each lighting part 164 (shown by a rectangle in FIG. 1) is electrically connected to the microcontroller 12 and is correspondingly disposed in one lamp cup 162, so that light emitted by the lighting part 164 is reflected by the corresponding lamp cup 162 so as to be projected substantially in the vertical direction V1; therein, each lighting part 164 can be realized by one or more LEDs. The second light-emitting device 18 includes at least one auxiliary lamp cup 182 (e.g. two auxiliary lamp cups) and at least one auxiliary lighting part 184 (e.g. two auxiliary lighting parts). Each auxiliary lamp cup 182 is disposed on the mount 102 between two adjacent auxiliary lamp cups 182, so that the light-out opening 182a of the auxiliary lamp cup 182 is toward the vertical direction V1. The at least one auxiliary lamp cup 182 as a whole can be taken as to be disposed on the mount 102 to surround the image-capturing part 14 relative to the vertical direction V1. Each auxiliary lighting part 184 (shown by a rectangle in FIG. 1) is electrically connected to the microcontroller 12 and is correspondingly disposed in one auxiliary lamp cup 182, so that light emitted by the auxiliary lighting part 184 is reflected by the corresponding lamp cup 162 so as to be projected substantially in the vertical direction V1; therein, each auxiliary lighting part 184 can be realized by one or more LEDs. Thereby, the first light-emitting device 16 and the second light-emitting device 18 can provide auxiliary illumination to the image-capturing part 14. The communication and connection interface 20 is disposed on the mount 102 and is electrically connected to the microcontroller 12. Thereby, the microcontroller 12 can communicate with an external electronic device through the communication and connection interface 20 (e.g. by receiving control signals, sending image data) and also can receive external electricity through the communication and connection interface 20. In practice, the communication and connection interface 20 can include a connection port exposed and disposed on the mount 102 or can be realized by a cable (including signal wires and power wires). The cable is connected to the microcontroller 12 and passes through the mount 102 to be connected to the external electronic device and a power supply.

Figure 3:
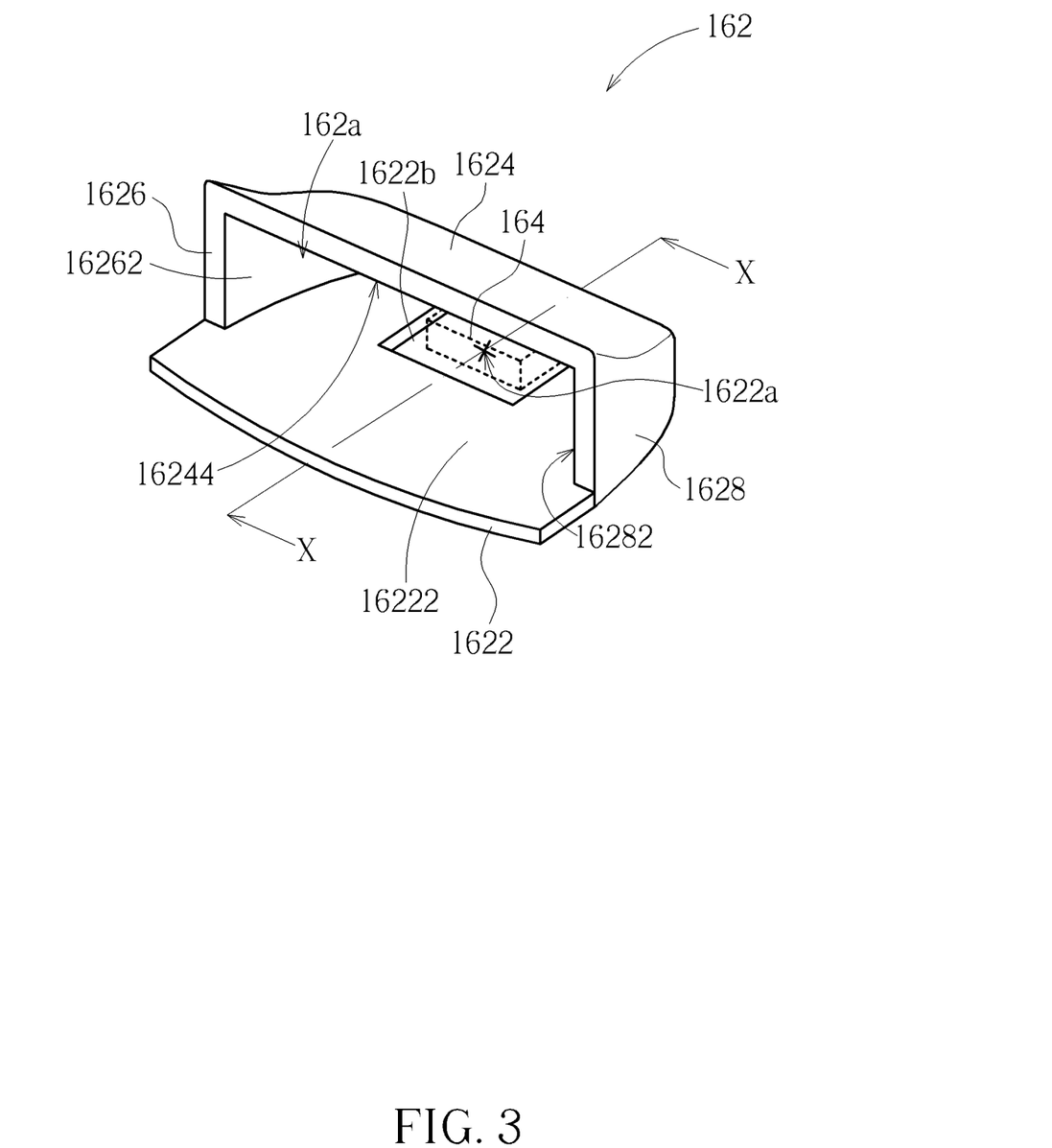
FIG. 3 is a schematic diagram illustrating a lamp cup of a first light-emitting device of the camera in FIG. 1.
Figure 4:
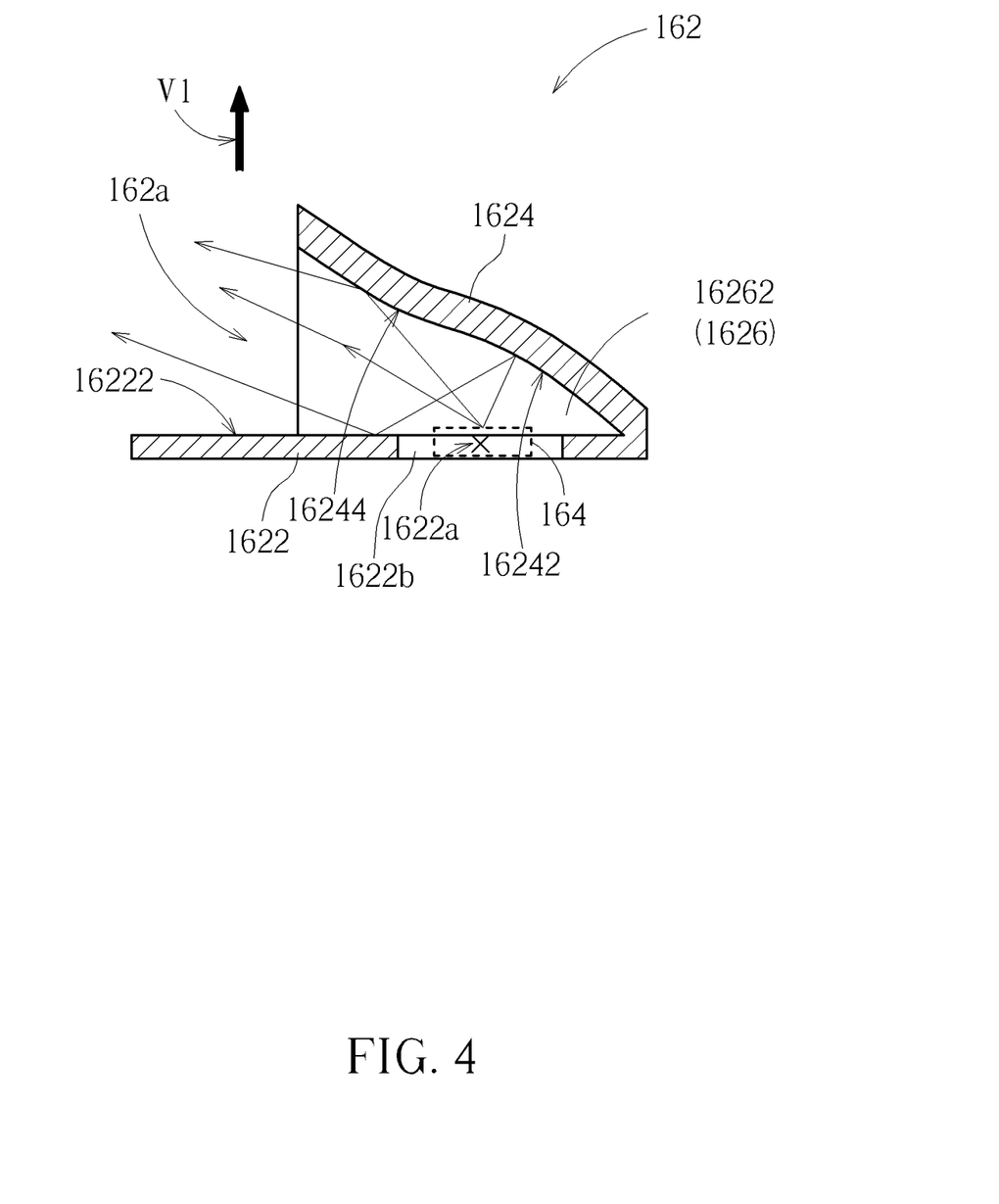
FIG. 4 is sectional view of the lamp cup in FIG. 3 along the line X-X.

Please refer to FIG. 3 and FIG. 4. The lamp cup 162 includes a first reflection member 1622, a second reflection member 1624, a third reflection member 1626, and a fourth reflection member 1628. The first reflection member 1622 defines a light source position 1622a thereon (indicated by a cross mark in FIG. 3 and FIG. 4) and has a first reflecting surface 16222. The first reflecting surface 16222 is toward the vertical direction V1. In the embodiment, the light source position 1622a is located in an accommodating recess 1622b (realized by for example but not limited to a through hole) of the first reflection member 1622; the corresponding lighting part 164 (shown by a rectangle in dashed lines in FIG. 3 and FIG. 4) is disposed in the accommodating recess 1622b toward the vertical direction V1. The second reflection member 1624 is disposed opposite to the first reflection member 1622. The second reflection member 1624 has a second reflecting surface 16242 and a third reflecting surface 16244 adjacent to the second reflecting surface 16242. In the embodiment, the second reflecting surface 16242 abuts the third reflecting surface 16244; however, the invention is not limited thereto. Therein, the second reflecting surface 16242 is toward the light source position 1622a. The third reflecting surface 16244 is toward the first reflecting surface 16222. The first reflection member 1622 and the second reflection member 1624 form a light-out opening 162a between the first reflecting surface 16222 and the third reflecting surface 16244. Thereby, when the corresponding lighting part 164 emits light, the light that travels from the lighting part 164 toward the second reflecting surface 16242 is reflected by the second reflecting surface 16242 and then is reflected by the first reflecting surface 16222 to emit out through the light-out opening 162a (of which the traveling path is indicated by thin lines with arrows in FIG. 4), and the light that travels from the lighting part 164 toward the third reflecting surface 16244 is reflected by the third reflecting surface 16244 to emit out through the light-out opening 162a (of which the traveling path also is indicated by thin lines with arrows in FIG. 4).

Furthermore, in the embodiment, the third reflection member 1626 and the fourth reflection member 1628 are disposed oppositely relative to the vertical direction V1 and between the first reflection member 1622 and the second reflection member 1624. The first reflection member 1622, the second reflection member 1624, the third reflection member 1626 and the fourth reflection member 1628 are connected to form a cupped structure. The opening of the cupped structure is the light-out opening 162a. In practice, the lamp cup 162 can be formed in one piece, for example by plastic injection molding; however, the invention is not limited thereto. For example, the reflection members 1622, 1624, 1626 and 1628 are fixed by another frame. In the embodiment, the third reflection member 1626 has a fourth reflecting surface 16262. The fourth reflection member 1628 has a fifth reflecting surface 16282. The fourth reflecting surface 16262 is opposite to the fifth reflecting surface 16282. Therefore, the first reflection member 1622, the second reflection member 1624, the third reflection member 1626, and the fourth reflection member 1628 form the light-out opening 162a among the first reflecting surface 16222, the third reflecting surface 16244, the fourth reflecting surface 16262, and the fifth reflecting surface 16282. The light that travels from the lighting part 164 toward the fourth reflecting surface 16262 and the fifth reflecting surface 16282 is reflected by the fourth reflecting surface 16262 and the fifth reflecting surface 16282 to emit out through the light-out opening 162a (of which the traveling path also is indicated by thin lines with arrows in FIG. 4).

Furthermore, in the embodiment, the first reflecting surface 16222 is a reflection plane. The second reflecting surface 16242 is a concave reflecting surface. The third reflecting surface 16244 is a convex reflecting surface. Each of the fourth reflecting surface 16262 and the fifth reflecting surface 16282 is a concave reflecting surface. A projection of an edge of the third reflecting surface 16244 at the light-out opening 162a onto the first reflecting surface 16222 in a direction parallel to the vertical direction V1 is located between an edge of the first reflecting surface 16222 and the light source position 16222a, so that the light emitted by the lighting part 164 disposed at the light source position 1622a will not substantially emit out in the vertical direction V1 through the light-out opening 162a (i.e. under the condition of not being reflected by the above-mentioned reflecting surfaces 16222, 16242, 16244, 16262 and 16282). Further, the light source position 1622a is located in a projection of the second reflecting surface 16242 onto the first reflecting surface 16222 in the direction parallel to the vertical direction V1; that is, the second reflecting surface 16242 covers the light source position 1622a in the vertical direction V1.

In addition, in practice, the range of the second reflecting surface 16242 and the third reflecting surface 16244 (i.e. the extension of the second reflecting surface 16242 and the third reflecting surface 16244 on the second reflection member 1624), the curvatures of all portions thereof, and the range of the first reflecting surface 16222 (i.e. the extension of the first reflecting surface 16222 on the first reflection member 1622, e.g. the distance between the end of the first reflecting surface 16222 and the light source position 1622*a*) can be determined (e.g. calculated by numerical simulation) according to the whole structure (including sizes and relative locations of all portions thereof) of the lamp cup 162 and a required light output distribution (i.e. an intensity distribution of light emitted out from the light-out opening 162*a*, e.g. which is designed to be uniform).

Figure 5:
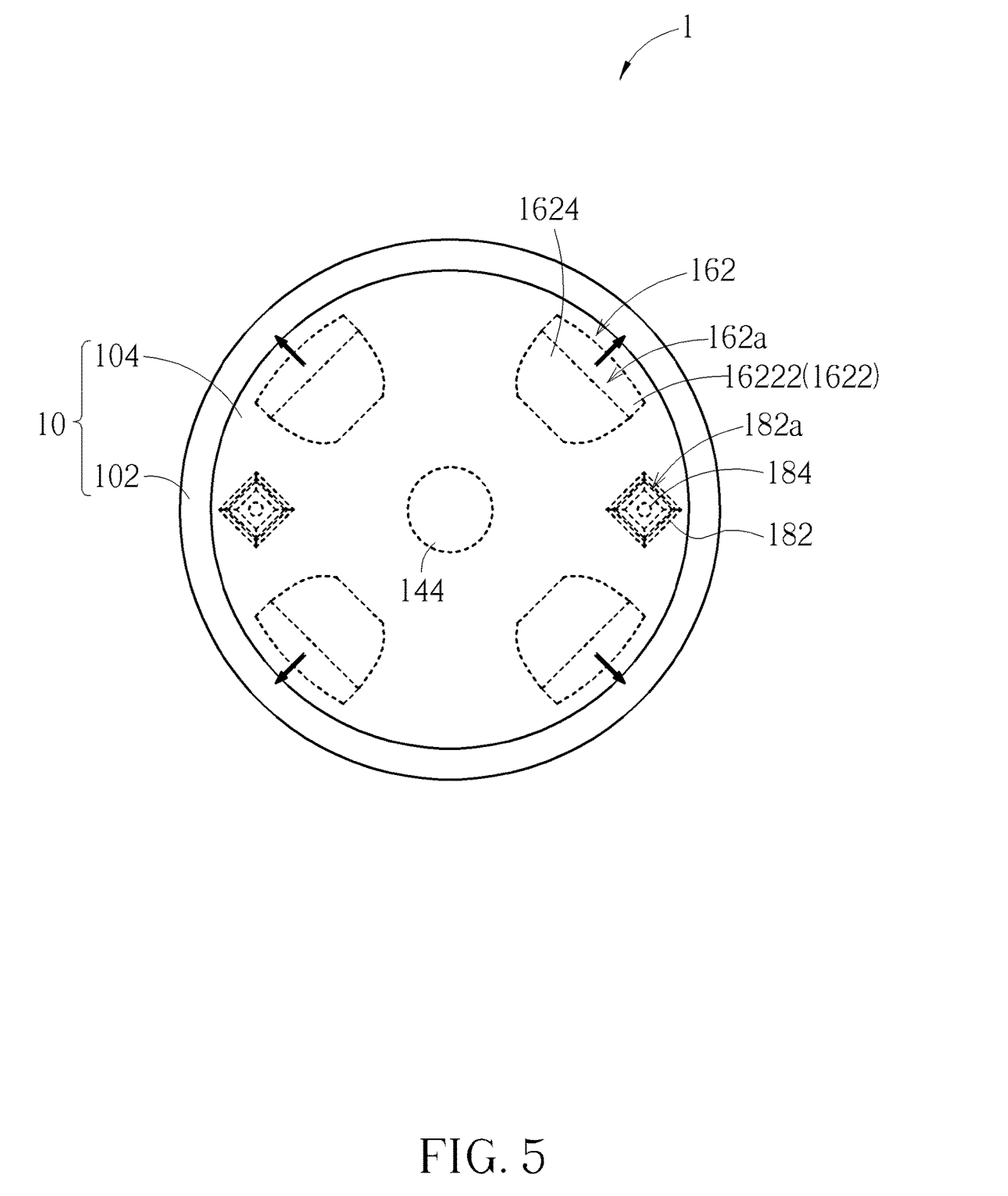
FIG. 5 is a top view of the camera in FIG. 1.
Figure 6:
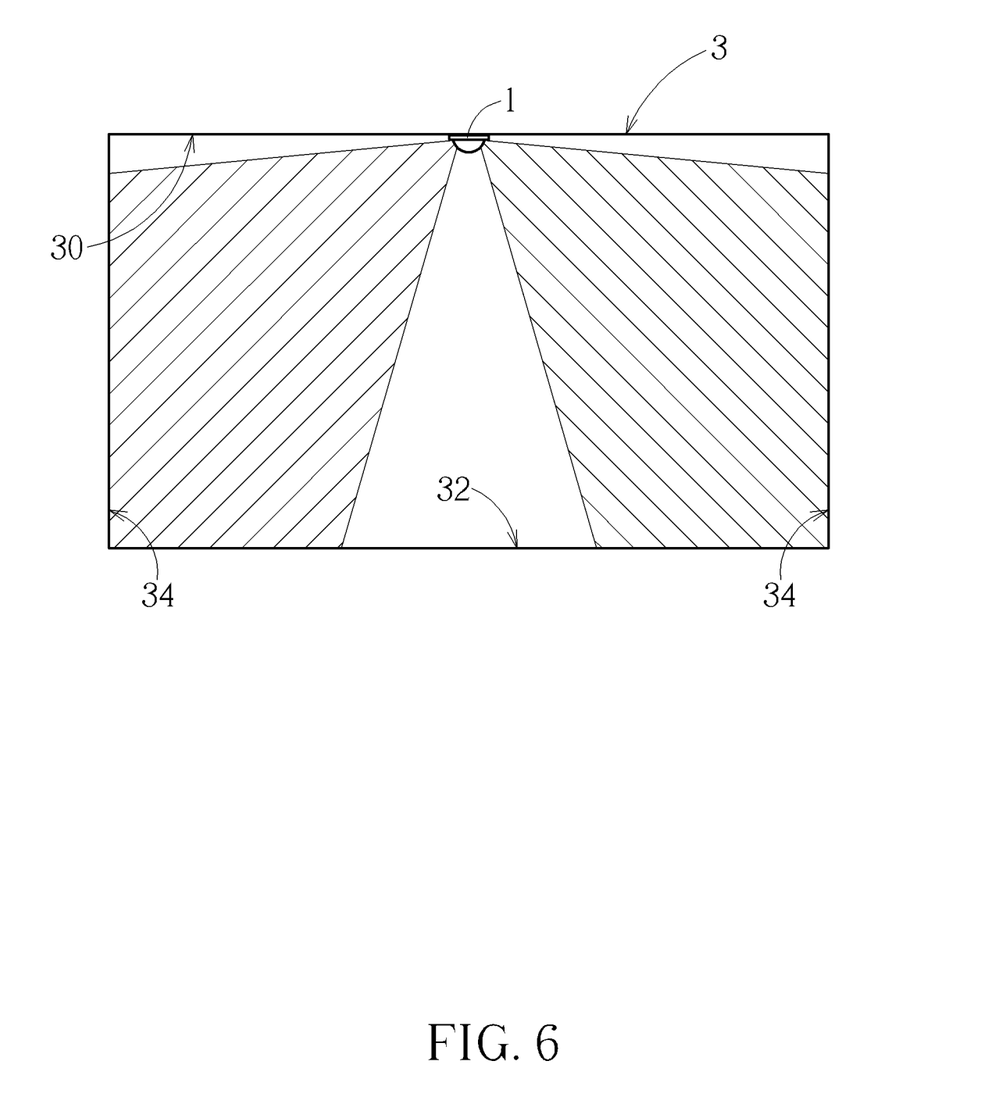
FIG. 6 is a schematic diagram illustrating that the camera in FIG. 1 is disposed in a room.
Figure 7:
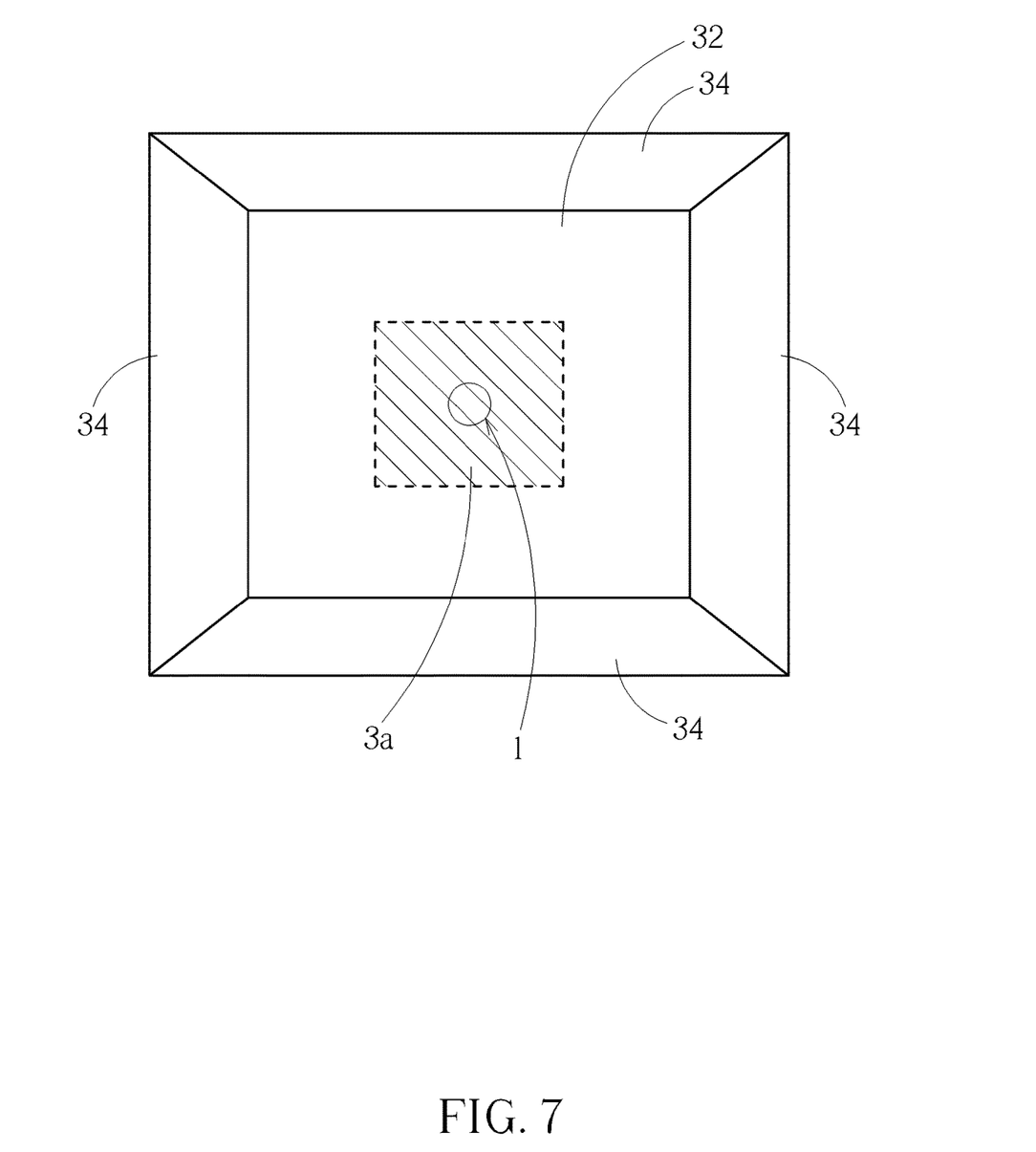

Please also refer to FIG. 5 to FIG. 7. When the camera 1 is disposed on a ceiling 30 of a room 3, an environment area, which the camera 1 can capture images of, includes a floor 32 and wall surfaces 34, as shown by FIG. 7. Therein, in the embodiment, the floor 32 is a square of 10 meters by 10 meters. The ceiling 30 is higher 5 meters than the floor 32. The circle at the center in FIG. 7 indicates the projection of the camera 1 in the vertical direction V1 onto the environment area. As shown by FIG. 5, in the embodiment, the four lamp cups 162 of the first light-emitting device 16 are disposed by equal central angles on a circumference relative to the image-capturing part 14 and surround the image-capturing part 14. The light-out openings 162*a* (indicated by arrows in FIG. 5) of the lamp cups 162 are disposed outward. Each lamp cup 162 provides alight output angular range of about 100 degrees in a horizontal direction to the corresponding lighting part 164, such that in the horizontal direction, the first light-emitting device 16 can provide 360-degree illumination; that is, the first light-emitting device 16 can illuminate all wall surfaces 34. In practice, the quantity of the lamp cup 162 and the light output angular range of the lamp cup 162 are not limited to the above and also can be determined according to an actual requirement (including locations of the lamp cups 162 on the camera 1, a relative location of the camera 1 in the room 3 and so on). As shown by FIG. 6, the illumination extent (indicated by the extent in hatched lines in FIG. 6) provided by the first light-emitting device 16 also includes a portion of the floor 30. As shown by FIG. 7, according to the illumination extent by the first light-emitting device 16 to the environment area, the environment area can be defined to include a central portion 3*a* (shown by a rectangle with hatched lines in FIG. 7) and an outer portion (i.e. the portion of the environment area with removing the central portion 3*a* in FIG. 7) surrounding the central portion 3*a*; that is, the first light-emitting device 16 can project light onto the outer portion but not the central portion 3*a*.

In addition, in the embodiment, the auxiliary lamp cup 182 of the auxiliary lighting part 184 shows a cupped structure. The corresponding auxiliary lighting part 184 is disposed at the bottom of the cupped structure, as shown by FIG. 1. The auxiliary lamp cup 182 can guide light emitted by the corresponding auxiliary lighting part 184 to travel in the vertical direction V1, so that the second light-emitting device 18 can project light onto the central portion 3*a*. In practice, the second light-emitting device 18 also project light onto a portion of the outer portion (e.g. the portion of the floor 32 close to the wall surfaces 34). Thereby, the light projected by the first light-emitting device 16 and the second light-emitting device 18 can illuminate the whole environment area. Furthermore, by a geometric design on the structure of the lamp cup 162 and the luminous powers of the first light-emitting device 16 and the second light-emitting device 18, the environment area can receive a relatively uniform illumination, so as to avoid the problem in the prior art that the auxiliary light source will produce excessively bright or excessively dark illumination to a shooting scene.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A lamp cup, comprising:
   a first reflection member, a light source position and a vertical direction being defined on the first reflection member, the first reflection member having a first reflecting surface, the first reflecting surface being toward the vertical direction; and
   a second reflection member, disposed opposite to the first reflection member, the second reflection member having a second reflecting surface and a third reflecting surface adjacent to the second reflecting surface, the second reflecting surface being a concave reflecting surface toward the light source position, the third reflecting surface being a convex reflecting surface toward the first reflecting surface, the first reflection member and the second reflection member forming a light-out opening between the first reflecting surface and the third reflecting surface;
   wherein when a lighting part is disposed on the light source position toward the vertical direction and emits light, the light that travels from the lighting part toward the second reflecting surface is reflected by the second reflecting surface and then is reflected by the first reflecting surface to emit out through the light-out opening, and the light that travels from the lighting part toward the third reflecting surface is reflected by the third reflecting surface to emit out through the light-out opening.

2. The lamp cup of claim 1, wherein the first reflecting surface is a reflection plane.

3. The lamp cup of claim 1, wherein a projection of an edge of the third reflecting surface at the light-out opening onto the first reflecting surface is located between an edge of the first reflecting surface and the light source position.

4. The lamp cup of claim 1, wherein the light source position is located in a projection of the second reflecting surface onto the first reflecting surface.

5. The lamp cup of claim 1, further comprising a third reflection member and a fourth reflection member, wherein the third reflection member and the fourth reflection member are disposed oppositely relative to the vertical direction and between the first reflection member and the second reflection member, the third reflection member has a fourth reflecting surface, the fourth reflection member has a fifth reflecting surface, the fourth reflecting surface is opposite to the fifth reflecting surface, and the first reflection member, the second reflection member, the third reflection member, and the fourth reflection member form the light-out opening among the first reflecting surface, the third reflecting surface, the fourth reflecting surface, and the fifth reflecting surface.

6. The lamp cup of claim 5, wherein each of the fourth reflecting surface and the fifth reflecting surface is a concave reflecting surface.

7. The lamp cup of claim 1, wherein the first reflection member has an accommodating recess, and the light source position is located in the accommodating recess.

8. A camera, comprising:
- an image-capturing part, disposed toward a vertical direction for capturing images of an environment area, the environment area comprising a central portion and an outer portion surrounding the central portion; and
- a first light-emitting device, surrounding the image-capturing part relative to the vertical direction for projecting light onto the outer portion, the first light-emitting device comprising a plurality of lamp cups and a plurality of corresponding lighting parts, each lamp cup comprising a first reflection member and a second reflection member, a light source position being defined on the first reflection member, the first reflection member having a first reflecting surface, the first reflecting surface being toward the vertical direction, the second reflection member disposed opposite to the first reflection member, the second reflection member having a second reflecting surface and a third reflecting surface adjacent to the second reflecting surface, the second reflecting surface being toward the light source position, the third reflecting surface being toward the first reflecting surface, the first reflection member and the second reflection member forming a light-out opening between the first reflecting surface and the third reflecting surface, the lighting part being disposed in the light source position of the corresponding lamp cup;
- wherein when the lighting part emits light, the light that travels from the lighting part toward the second reflecting surface is reflected by the second reflecting surface and then is reflected by the first reflecting surface to emit out through the light-out opening, and the light that travels from the lighting part toward the third reflecting surface is reflected by the third reflecting surface to emit out through the light-out opening.

9. The camera of claim 8, wherein the second reflecting surface is a concave reflecting surface, and the third reflecting surface is convex reflecting surface.

10. The camera of claim 9, wherein the first reflecting surface is a reflection plane.

11. The camera of claim 8, wherein a projection of an edge of the third reflecting surface at the light-out opening onto the first reflecting surface is located between an edge of the first reflecting surface and the light source position.

12. The camera of claim 8, wherein the light source position is located in a projection of the second reflecting surface onto the first reflecting surface.

13. The camera of claim 8, wherein each lamp cup comprises a third reflection member and a fourth reflection member, the third reflection member and the fourth reflection member are disposed oppositely relative to the vertical direction and between the first reflection member and the second reflection member, the third reflection member has a fourth reflecting surface, the fourth reflection member has a fifth reflecting surface, the fourth reflecting surface is opposite to the fifth reflecting surface, and the first reflection member, the second reflection member, the third reflection member, and the fourth reflection member form the light-out opening among the first reflecting surface, the third reflecting surface, the fourth reflecting surface, and the fifth reflecting surface.

14. The camera of claim 13, wherein each of the fourth reflecting surface and the fifth reflecting surface is a concave reflecting surface.

15. The camera of claim 8, wherein the first reflection member has an accommodating recess, and the light source position is located in the accommodating recess.

16. The camera of claim 8, further comprising a second light-emitting device, wherein the second light-emitting device comprises at least one auxiliary lamp cup and at least one corresponding auxiliary lighting part, the at least one auxiliary lighting part is disposed in the at least one corresponding auxiliary lamp cup, each auxiliary lamp cup is disposed between two adjacent lamp cups of the first light-emitting device, and the auxiliary lamp cup has a light-out opening toward the vertical direction for projecting light onto the central portion.

* * * * *